(12) United States Patent
Nemanick et al.

(10) Patent No.: US 12,492,017 B2
(45) Date of Patent: Dec. 9, 2025

(54) INDEPENDENT NON-SOLAR POWERED EXPLORATORY CRAFT FOR ORBITAL RENDEZVOUS AND POSITIONING FRAMEWORK

(71) Applicant: The Aerospace Corporation, El Segundo, CA (US)

(72) Inventors: Eric Joseph Nemanick, Santa Monica, CA (US); Henry Helvajian, Pasadena, CA (US); Andrea G. Hsu, El Segundo, CA (US); John H. Schilling, Lancaster, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 411 days.

(21) Appl. No.: 18/320,406

(22) Filed: May 19, 2023

(65) Prior Publication Data
US 2024/0383622 A1    Nov. 21, 2024

(51) Int. Cl.
*B64G 1/40*    (2006.01)
(52) U.S. Cl.
CPC .................................. *B64G 1/413* (2023.08)

(58) Field of Classification Search
CPC ......... B64G 1/413; B64G 1/411; B64G 1/422
See application file for complete search history.

(56) References Cited

U.S. PATENT DOCUMENTS

| | | | |
|---|---|---|---|
| 3,510,362 A * | 5/1970 | Charland | H10N 10/813 |
| | | | 136/202 |
| 5,246,505 A | 9/1993 | Mowery, Jr. | |
| 9,650,159 B2 | 5/2017 | Kaltenbach | |
| 2024/0021336 A1* | 1/2024 | Nemanick | G21H 1/103 |
| 2025/0121958 A1* | 4/2025 | Conkle | B64G 4/00 |
| 2025/0140429 A1* | 5/2025 | Morrison | G21F 3/00 |

FOREIGN PATENT DOCUMENTS

WO    2004049538 A2    6/2004

* cited by examiner

*Primary Examiner* — Valentina Xavier
(74) *Attorney, Agent, or Firm* — LeonardPatel PC (57) ABSTRACT

An isotope power source configured to act as a vehicle includes a plurality of radioisotope power sources encased around one or more elements therein to form a tile-shaped spacecraft.

21 Claims, 6 Drawing Sheets

INDEPENDENT NON-SOLAR POWERED EXPLORATORY CRAFT FOR ORBITAL RENDEZVOUS AND POSITIONING FRAMEWORK

FIELD

The present invention relates to a radioisotope powered tile-based spacecraft for long duration, and a highly mobile spacecraft capable of close target approach, deployment of a local positioning system and conducting a "tugboat" like positioning service.

BACKGROUND

Mobile spacecraft are launched into orbit with a defined mission, and have a lifetime based on the availability of electrical power, the amount of onboard propellant, and the mean time to failure (MTF) of the critical components. Market studies in 2020 show that the number of spacecraft to be launched per year might broach 1000/year by 2032. Consequently, it is anticipated that the servicing of these spacecraft by other and likely smaller "assistants" will be necessary and ubiquitous, and that the deployment of smaller, highly mobile spacecraft for repair and maintenance inspections, positioning, or deployment will be necessary. The "assistant spacecraft" are likely to co-orbit the primary vehicle or a group of primary vehicles by providing capabilities to repair, serve as guard watch (with cameras linked to Earth), or modify the primary vehicle mission by enhancing its capabilities.

It is anticipated that in-space-assembly and manufacturing (ISAM) will also take a strong foothold within this decade, where primary vehicles are launched to help assemble even larger space structures e.g., argosy-like, these structures will manufacture products to be returned to Earth, and to build an in-space infrastructure for venturing beyond Earth's orbit. "Assistant spacecraft" will also be needed for ISAM, with the capability to maneuver themselves freely in space, approach a target spacecraft with precision, and use optical or other payloads to inspect or evaluate their target.

One conclusion that can be derived is that the "Assistant Spacecraft" will be numerous, ubiquitous in their use and would need to be able to operate for long durations (i.e., beyond the duration of service life of primary spacecraft) and in orbits that as "assistants" they do not dictate, where solar power is limited, and local temperatures are well below the operational range of electronics. In addition, and as technology improves to enable a near permanent human presence on the moon, mars or for robotic exploration of other systems (i.e., planets, moons, asteroids) within our solar system, a ground-based "assistant-craft" will also be necessary that aids and maintains/services to the established infrastructure. These assistant-craft would physically look different for operations in orbit or on an off-world ground site, but would provide services as necessary with the same restrictions. The assistant-craft should last a long time, might have to operate in darkness, and in cold environment.

The embodiments described in the passages below describe an assistant spacecraft (or craft) designed to work either alone, or in concert with other assistant-crafts in a local area to accomplish necessary but not primary-mission tasks (e.g., security, localized-GPS, repair, etc.) that can best be done alone or via the concerted effort of the group.

At the basis of some embodiments lies the concept of an assistant, which carries a compact power source, that operates without the need for solar radiation (e.g., in orbits that carry it into orbital shadows, or terrestrially for indoors and underground applications), has long duration propulsion (for space) or locomotion (for ground), and has knowledge of precise positioning relative to a local reference frame and has rapid on-board computation.

For an in-space assistant to be useful, the assistant must be nimbler than the primary vehicle it is assigned to serve. The amount of acceleration, a, of a spacecraft depends on the primary vehicle mass, m, the propellant flow rate, f, and exhaust velocity, $V_{exh}$. The relationship is given by $a=V_{exh}(f/m)$. For a fixed exhaust velocity and propellant flow rate, a higher acceleration is possible for a smaller mass spacecraft. Newton's second law ($F=ma$ or $a=F/m$) also suggests a similar dependence with mass for a ground based Assistant. For both ground and space applications and nimble spacecraft is one with lower mass.

However, the electrical power requirements for long duration missions with conventional solar power and propulsion systems are too heavy to produce a low mass spacecraft with high mobility. Consequently, a lightweight radioisotope powered vehicle is required. Radioisotope based power sources (e.g., radioisotope thermal electric generator RTG) have been in use for over 50 years, but they are not lightweight because they were designed to only power very large spacecraft for deep space missions, such as Voyager, Pioneer, and Mars Science Laboratory. Thus, some embodiments described in the later sections describe assistants based on the use of a radioisotope power systems that are small in form, containing within it all of the components to make a functional, mobile spacecraft. This large scale and mass for radioisotope powered vehicles also impacts their mobility, as the increased mass creates a feedback requirement that the propulsion system be larger, heavier, and more capable. Utilization of a small, compact radioisotope power source allows for light weight, low impulse propulsion systems to move these smaller, lighter spacecraft.

Accordingly, the utility of an assistant improves the mission of the primary spacecraft as for example in helping to open (tugboat analogy) a large starshade that flies in concert with a large space telescope to search for exoplanets.

SUMMARY

Certain embodiments of the present invention may provide solutions to the problems and needs in the art that have not yet been fully identified, appreciated, or solved by current small spacecraft technologies. For example, some embodiments of the present invention pertain to a spacecraft, which is a compact power tile merged with a propulsion component. In an embodiment, the spacecraft uses radioisotope power source distributed within the tile to generate both heat and electricity.

In one embodiment, an isotope power source configured to act as a space vehicle includes a plurality of radioisotope power sources encased around one or more elements therein to form a tile-shaped spacecraft. In some embodiments, the shape of the spacecraft or terrestrial craft is determined by the primary "assisting" mission.

In another embodiment, an isotope power source configured to act as a spacecraft vehicle includes a plurality of radioisotope power sources encased around one or more elements therein to form a tile-shaped spacecraft. The one or more elements comprise one or more electrospray propulsion units configured to maneuver the tile-shaped vehicle. In some embodiments, the shape of the spacecraft or terrestrial craft is determined by the primary "assisting" mission.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments pertain to a spacecraft platform (e.g., a tile), which is a small (<1 kg) compact radioisotope power system with an internal electric propulsion system to power and propel the spacecraft. In this embodiment, the power source may be distributed. In another embodiment where the power source is central unit, the spacecraft uses a radioisotope thermopower generator (RTG). In both embodiments, the power source generates heat and electricity and both are utilized to advantage. For purposes of explanation, some embodiments may be directed to isotopes that include not only atomic species but also molecular species. For purposes of explanation, the term "tile" may be used interchangeably with tile based spacecraft, tile based vehicle, tile craft, tile vehicle. It should be further noted that the shape of the tile is not limited to a square, but may be any shape.

Described below are embodiments that explain the use of this power source for space applications. It is to be noted that by equivalence, the embodiments can be applied to ground vehicles. Space applications are used in this embodiment because it is the harder of the two and includes operation in true three dimensions (3D).

In addition to the lightweight (<1 kg) and compact (<0.5 L) RTG and the electric propulsion system, the spacecraft also has an attitude control system, communication, navigation, and computer processing, and incorporates payloads which may include a camera, magnetometer, spectrometer, other sensors and/or other payloads of interest. This spacecraft is independently powered by the RTG and is self-mobile by use of an electric propulsion system, and can be placed in orbit or elsewhere in space such as a Lagrangian point, Hohmann points, or Earth or other body orbits with instructions to independently navigate to accomplish tasks using its payloads. The spacecraft has an essentially indefinite mission length given its isotope power source (power delivery for 50+ years) and a highly capacious electric propulsion propellant system, and requires no batteries or heaters given its internal heat production and constant power production regardless of solar illumination. The spacecraft may move from one position in its orbit to any other position under its own power to visit other vehicles for inspection, repair, or other interactions.

Conventional spacecraft use solar illumination for power from photovoltaic arrays, must also have batteries for storage of that energy to power the vehicle when the sun is eclipsed by the earth. In addition, the power budget for such a spacecraft must also include powering heaters onboard to keep the critical systems warm e.g., during eclipse, increasing the amount of solar power required, and increasing the mass of the solar arrays and the batteries in a negative feedback loop. The miniature RTG not only delivers electrical power to the vehicle regardless of solar illumination (no batteries needed), but also provides all of the heat needed for the vehicle through its isotope decay. Thus, the additional mass for the solar arrays, larger power systems, and batteries all of which increase the mass and must be accelerated and decelerated in an orbit change require a larger propulsion system and more propellant (which themselves have more mass and add to the propulsion requirement). Previous RTG powered spacecraft were so large (>500 kg) that they required large amounts of power (and radioisotopes), and had propellant requirements so large that very few orbital adjustments were possible, substantially limiting their mission duration and capabilities. These large vehicles could not be deployed near Earth due to the large amount of isotopes used and could not be maneuvered close to other vehicles due to the risk of catastrophic collision. A small, modular RTG vehicle with small amounts of isotopes (<100 g) can perform long duration missions for close approaches to target spacecraft or other locations more carefully than existing RTG vehicles, and in a smaller, nimbler package than conventional, solar+battery powered spacecraft it could stay deployed decades longer than a conventional vehicle, with less isotope dispersion risk during launch.

In some embodiments, the spacecraft includes a compact electric power source using isotope heat and a heat-to-electricity conversion system, coupled with an electric propulsion system. These embodiments utilize a flat shaped structure (>5:1 radius/length:thickness ratio) that holds the isotope power source, including and reaction wheels or other orientation capabilities, and an array of electric propulsion units for maneuvering, as well as processing, communications, navigation, and payload units. The flat shape (high surface area to volume) is required to efficiently convert the isotope heat to electricity through surface radiation, and the vehicle cannot operate without this shape without adding radiative surface area in some other fashion, typically using extended radiators, which add additional mass and volume. This spacecraft also may contain energy storage capability, typically in the tile for utilization of the waste heat or electricity for use of the onboard communication, control systems, propulsion, processing, and one or more payloads.

In certain embodiments, a plurality of these tile vehicles are arranged to set up a local coordinate system such as a local positioning system (such as GPS). In such an embodiment, one or more tiles serves as a reference point or arrangement among the other tile-vehicles. These tiles may communicate with the other tiles their relative position and within the plurality of the tile-vehicles each tile-vehicle would know its position with precision, or for each tile-vehicle to determine its relative position to other tile-vehicles, and collectively then determine each individual positions. The precision by which each tile-craft knows its location and that of the others is refined by computational models within each tile-craft that predicts the location of each tile-craft at a future time. This prediction is tested by acquiring data at future time and comparing with the positioning knowledge gathered at future time. With this technique, the error in the prediction is reduced over time and baring the application external forces a moving coordinate system, which is internally self-consistent and precise can be developed. Such an arrangement allows for a precision coordinate system to be locally established. Any other vehicle may then exist within the defined coordinate system volume and by establishing its position relative to one of the tile-craft could then know, with precision, its relative location to any other object in the volume. In some embodiments, the other vehicle that entered the coordinate system volume does not need to communicate with the tile-craft. If the tile-craft can obtain range information on the other vehicle, the tile-craft may identify the position of the other vehicle within the volume. If the other vehicle can communicate with the tile-craft vehicles, then the tile craft may use the knowledge of its position and move about the coordinate system volume with precision. The algorithms for establishing the local coordinate system use conventional techniques that are a kin to positioning cell phones given a small cluster of cell phone towers, but in some embodiments this capability enables the establishment (i.e., a local GPS system) anywhere off-world, in space or on some off-world structure which could be in liquid "ocean". In the off-world structure case the tile-vehicles are grounded while in the liquid "ocean" world they would have propulsion to operate in the liquid and have the means for communicating within the "ocean" environment.

Figure 1A:
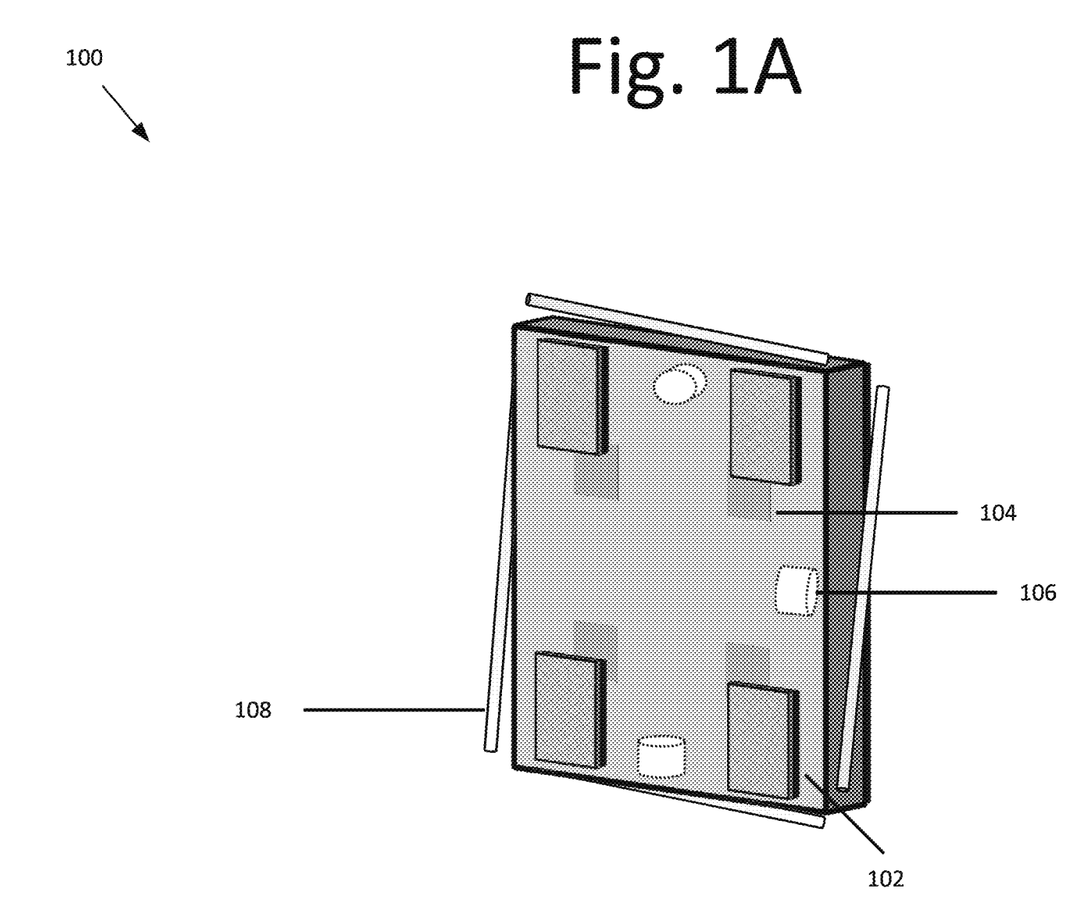
FIGS. 1A and 1B are diagrams illustrating a tile, which is a complete spacecraft, according to an embodiment of the present invention.
Figure 1B:
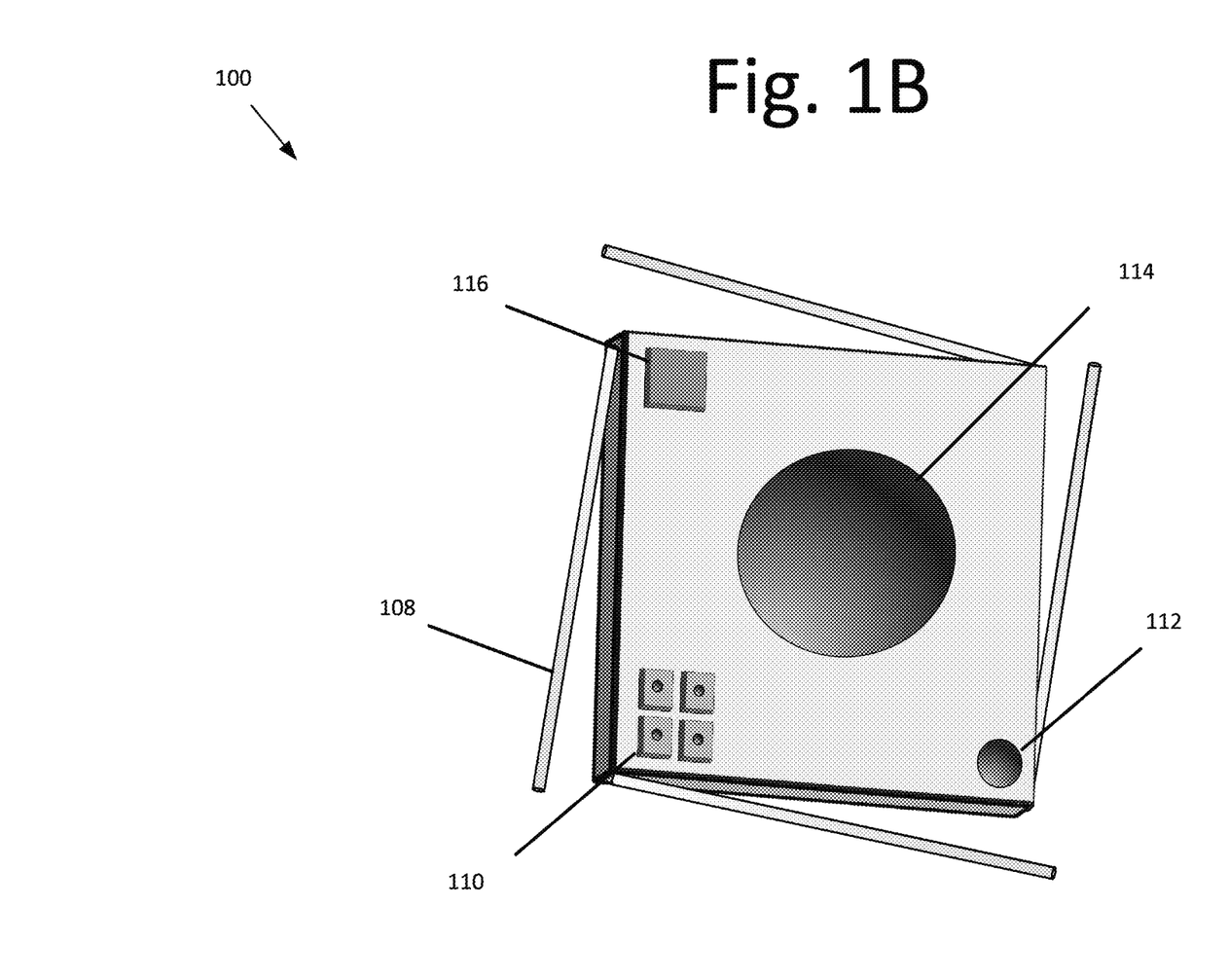

FIGS. 1A and 1B are diagrams illustrating a tile 100, which is a complete spacecraft, according to an embodiment of the present invention. Unlike a conventional disk satellite (DiskSat) or a cube satellite (CubeSat), tile 100 does not require sunlight to generate power, because tile 100 includes one or more isotope heat-to-electricity power sources 104, such as a radioisotope thermoelectric power source. This allows the lifespan of tile 100 to operate for 80 years or more, based on the isotope half-life. Tile 100 also contains a number of electrospray propulsion units 102 for maneuvering the lightweight vehicle. The low propellant usage per orbital adjustment ($<<1$ g) enables the vehicle to contain sufficient propellant for the vehicle to make $100s$ of maneuvers, far larger than conventional spacecraft, whose high mass typically restricts even the most capable vehicles to only a handful of maneuvers in its entire operational life. This also allows the vehicle(s) to perform extremely long duration station keeping operations in non-orbital environments such as Lagrangian points. This also allows tile 100 in this embodiment to measure only 15×15 cm wide and have a 2 cm thickness; all while maneuvering high resolution optical 114, 112 or spectroscopic payloads quickly using an electric propulsion system. These vehicles communicate the payload data through the use of antenna 108, to either ground stations or to other spacecraft. This vehicle tile 100 requires a high aspect ratio (>5:1 for length/width to thickness) to function through isotope power generation, by using the large surface area to radiate heat for efficient heat to power conversion.

Further, conventionally designed SmallSats and CubeSats cannot incorporate power generation and propulsion in a small package (less than 20 kg). The size limitation means that there exists no spacecraft technology in the sub 20 kg design space for a long duration, high mobility vehicle. In short, by having at its core a compact isotope power source 102, tile 100 remains small and/or compact and operates in space where there is no sunlight, and low mass enough to use high efficiency electric propulsion systems, and carry sufficient propulsion for multiple orbit adjustments.

As noted above, tile 100 enables establishing a localized coordinate system around an object anywhere in space. For example, tile 100 with other tiles may provide precise colocation without needing a GPS or location systems anywhere in space. While tiles 100 have GPS, there are orbits about Earth where GPS signals are non-existent, even more so when the mission is far off-world (e.g., other planets and moons, asteroids, Lagrangian points, inter location transit). Without GPS, precision location in 3D space is only poorly possible via triangulation of numerous wireless signals. Tile 100 just needs to have the facility for communicating with other similar tiles.

In some embodiments, tile 100 incorporates wireless transmission including radio frequency (RF), but also optical, or other wavelengths of light to communicate with other Assistants in the area. The location of a radio transmitter or other photon transmitter, such as lasers, masers or other emitters, may be determined by measuring the radial distance (e.g., Received Signal Strength Indicator (RSSI) in RFID tags) or the direction of the received signal from 2 or 3 different points. For example, a single tile 100 broadcasts a radio signal that includes information such as local time (e.g., onboard computer timing) which is received by one or more other tiles (e.g., Assistants). The location of the broadcaster (i.e., the reference point) in relation to all the receiving tile 100 can be determined by triangulation.

The receiving tile, in some embodiments, may then share its location (e.g., range with respect to the broadcaster) with the other Assistants. The result produces a 3D coordinate system such that any motion of tile 100 or other tiles within the vicinity can be tracked with precision. In one example, the next generation IEEE 802.11ay (WLAN), which operates at 60 GHz frequency, may provide precision location better than 5 mm. Of more utility of this local positioning system is its use in ISAM operations. In ISAM, structures are assembled via precision autonomous docking maneuvers and these robotic structures have simple receivers tuned to the local positioning system broadcasting frequency, which allows them to move with good knowledge of their location.

In another embodiment, the position of each Assistant within the network volume (in space or on the ground) may be determined through each individual Assistant determining their own distance from each other Assistant in the volume. For N total Assistants, each Assistant makes N−1 distance measurements, one to each other Assistant, for a total of N (N−1) measurements. This total set of measurements will include 'redundant' measurements, i.e., from Vehicle A determining its distance to Vehicle B (AB), but also Vehicle B determining its distance to Vehicle A (BA). However, these measurements, being independently made, can be used together improve the precision of the true distance [AB]. The matrix of N (N−1) measurements can then be used to provide more precise positioning of any participant within the spatial volume inhabited by the Assistants or other participating measurement node(s).

In some embodiments, a plurality of isotope power sources 102 may be embedded within or around tile 100. In addition to isotope power sources 102, a corresponding number of electrospray propulsion (EP) units (or thrusters) 104 may be embedded in or on tile 102. Each EP unit 104 may be a 1 W propulsion unit, with 25 g of propellant, 12 mN of thrust, and 1250 s specific impulse, for example. EP unit 104 allows for independent movement, enabling close approach at the inspection target, and low mass creates low risk of collision damage.

Tile 102 may include a plurality of reaction wheels or rods 106 configured to orient the spacecraft for both directional propulsion purposes, but also for orientation of the payloads and communication components. This orientation control may be accomplished with these components alone, or may work in conjunction with the propulsion system to control vehicle orientation. Additionally, tile 102 may include a plurality of (ultra-high frequency) antennas 108 configured to transmit information to other vehicles in space, or to ground systems for control purposes, for data delivery, or coordination with other vehicles. Other components that tile 102 may include are as follows: Global Positioning System (GPS) antenna 110, star tracker 112, camera/spectrometers 114, and an ultra-high frequency (UHF) transceiver 116. For example, tile 102 may include antennas that sense the polarization of the RF communication signal allowing tile 102 to change its orientation to maximize the RF signal and thereby set its attitude in relation to broadcasting tile.

This vehicle can be up to 2 kg in mass, and 1000 $cm^3$ in volume, but still generate constant power output and be capable of hundreds of orbit changes, unlike any conventionally powered and propelled vehicle design.

In another embodiment, tile 102 is the isotope power source in so far that all components are built inside of the isotope power container. For example, spacecraft components may be built inside of the isotope power source (power distribution boards, avionics processors, sensors, and attitude control units). In this embodiment, the electronics may utilize radiation hard electronics (Silicon Carbide (SiC) or Gallium Nitride (GaN)) or the use of MEM-tronics in which the transistors are inherently radiation-hard because they are large physical structures. Consequently, the isotope power unit container, as defined by the radiator surface extent, and within the thermal insulation necessary for the isotope and thermoelectrics a host of elements, such as processors, command and control boards, cameras, attitude control units and sensors, antenna control boards and transceivers. All of these components are internal to the isotope power system extent, which has a defined pair of radiator surfaces (front and back), and requirements for thermal insulation around the hot isotopes and thermoelectric conversion components (shown as RTG core 210 in FIG. 2A). This radiator component(s) regulate the temperature of the vehicle through radiation of heat produced by the isotope and electronics systems, and maintain the vehicle at a temperature compatible with the electronics components (−30° C. to 80° C.).

Figure 2A:
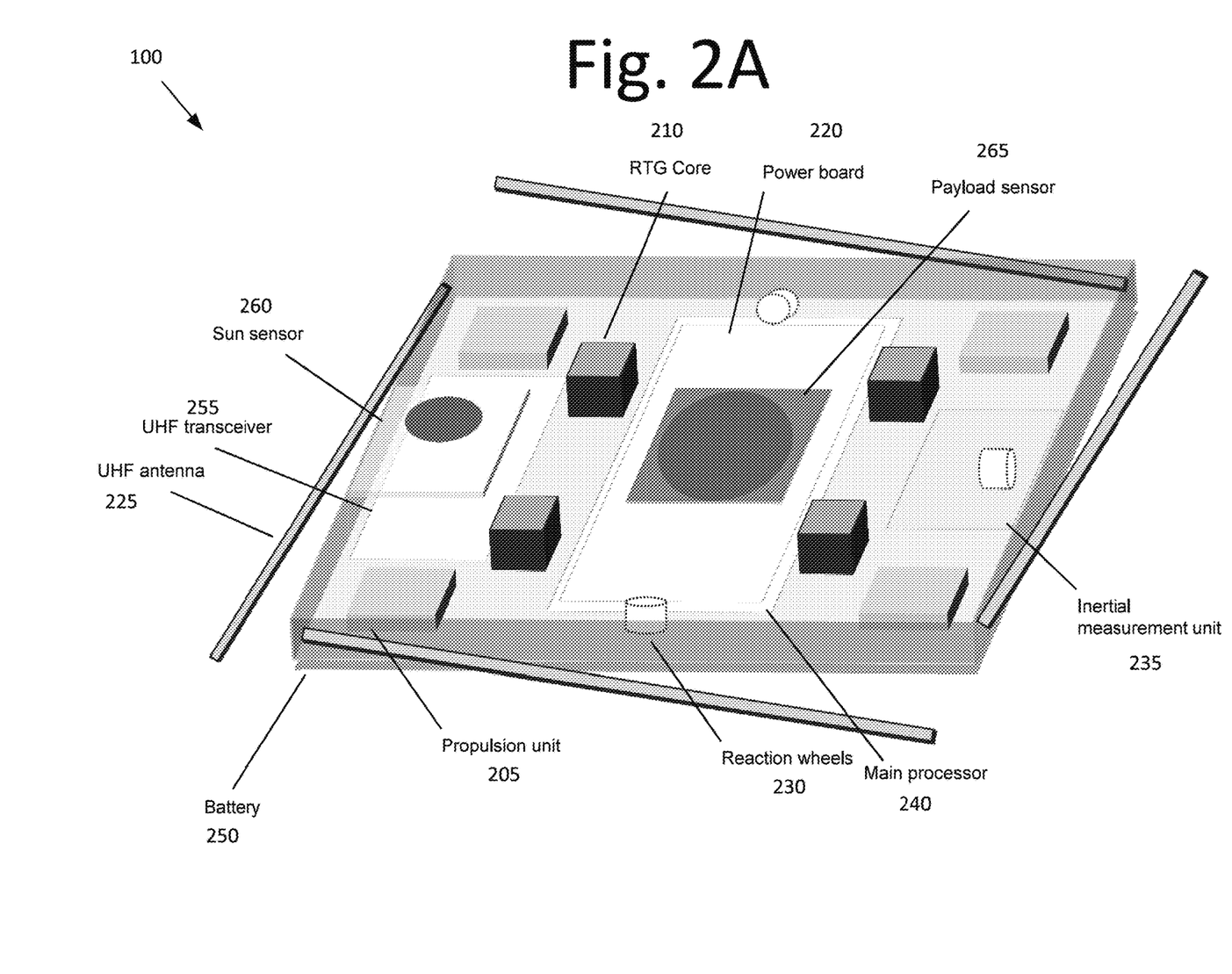
FIGS. 2A and 2B are diagrams illustrating how an isotope power source acts as a spacecraft, according to an embodiment of the present invention.
Figure 2B:
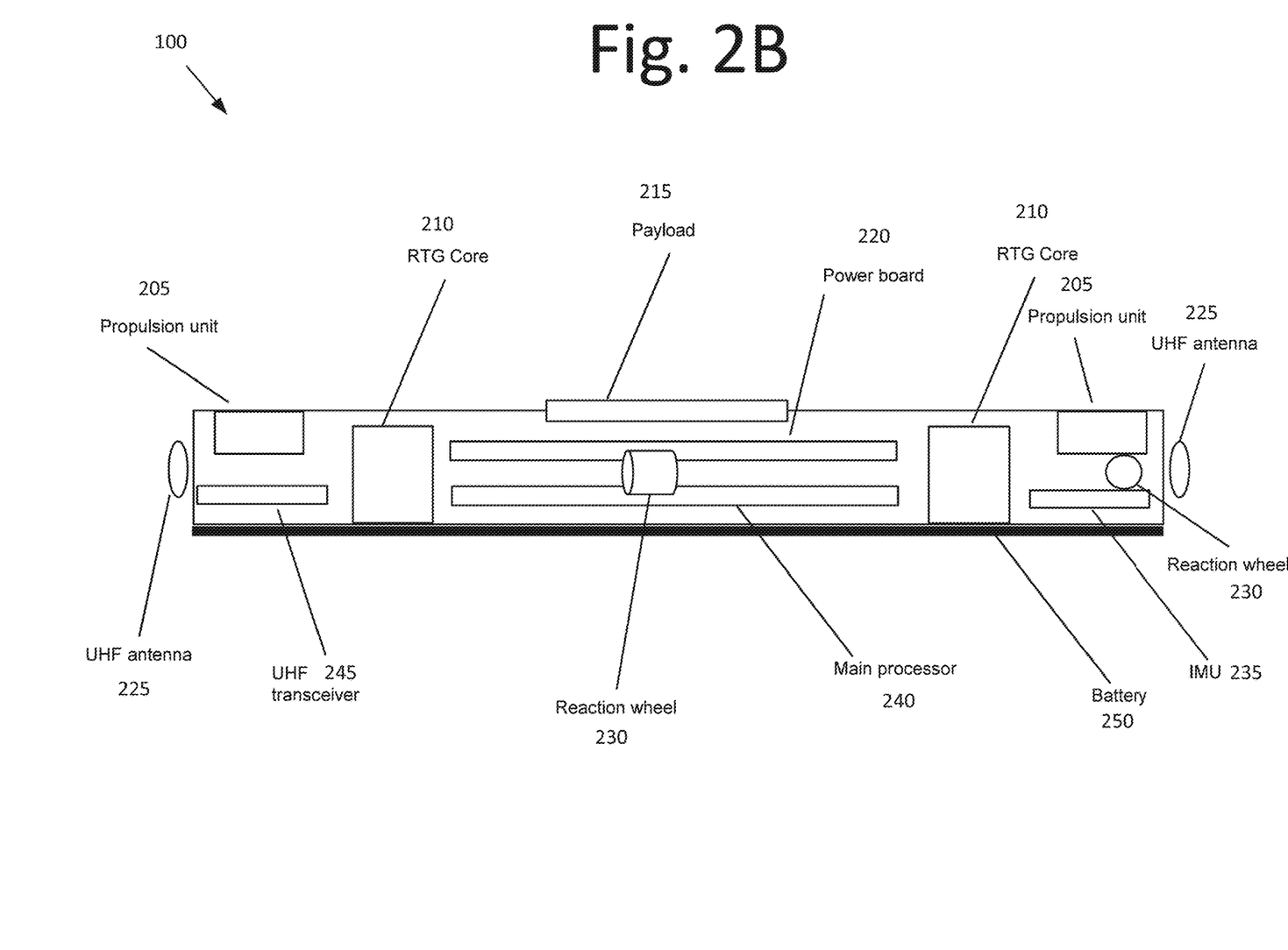

FIGS. 2A and 2B are diagrams illustrating how an isotope power source 100 acts as a spacecraft, according to an embodiment of the present invention. In some embodiments, isotope power source 100 is tile shaped with internal space such that additional elements are embedded therein. For example, isotope power source 100 acts as an autonomous small spacecraft (e.g., 500 g) that patrols a region of space using its own power and propulsion, performing visual, spectroscopic, or other evaluations, and reports telemetry for action. The isotope power source 100 packs critical data gathering in a small, but capable and mobile package.

In this embodiment, isotope power source 100 includes a propulsion unit 205, one or more RTG core(s) 210, a payload 215, a power board 220, one or more UHF antenna(s) 225, one or more reaction wheel(s) 230, an inertial measurement unit (IMU) 235, a main processor 240, a UHF receiver 245, a battery 250, a UHF transceiver 255, a payload sensor 260, and/or a sun sensor 265.

Isotope power source 100 is based around a small, modular radioisotope thermoelectric power source with an electric propulsion unit 205, with not only the capability for independent movement, but also the power to conduct payload operations. The isotope power source 100 provides both power and heat in a compact spacecraft and reduces the reliance on a mission limiting battery. Electric power is sufficient to operate vehicle avionics (navigation, power distribution, command and control), propulsion (electric or electrospray propulsion, attitude control), and payloads 210 without the need for a battery.

A mission for such embodiments may include a suite of isotope power sources (e.g., spacecrafts), with a single isotope power source (e.g., spacecraft) capable of navigating to any other point in its space quickly to visually, spectroscopically, or electronically inspect a target to attempt to diagnose the issue. Using the isotope power supply and electric propulsion system, problem locations are easily and rapidly identified.

Isotope power source 100, which acts as a spacecraft, rapidly deliver eyes on problems, operated from a constellation of spacecrafts that maintain operations for decades. The entire mission to cover a GEO orbit can be covered with 1 U of volume, making the mission compact and inexpensive. A space station or orbital foundry could be covered with only a handful of these spacecrafts.

The use of the compact power and heat source breaks the minimum size limits from solar, battery, and thermal requirements, enabling a small, deployable unit. Not much larger than a drink coaster but as capable as a smart phone, some embodiments deliver key interactions with any orbital or cis-lunar vehicle that has or will be deployed.

There exists no spacecraft design capability using current technology for solar power generation and battery storage as well as sufficient propulsion capability for 10's of orbit changes in the size class below 20 kg. The base requirements for solar power generation and storage, in addition to thermal management (heaters) already exceeds the size of this vehicle, at >2 kg. As the mass of the vehicle increases, the size of the propulsion unit and the required propulsion also increases. This then increases the amount of power and heat required, which then increases the amount of propulsion mass and power required. These combined effects mean that building a conventionally (solar+battery) powered vehicle cannot be accomplished below 10 kg, if the vehicle is also to be mobile and capable of multiple orbit changes.

Figure 3:
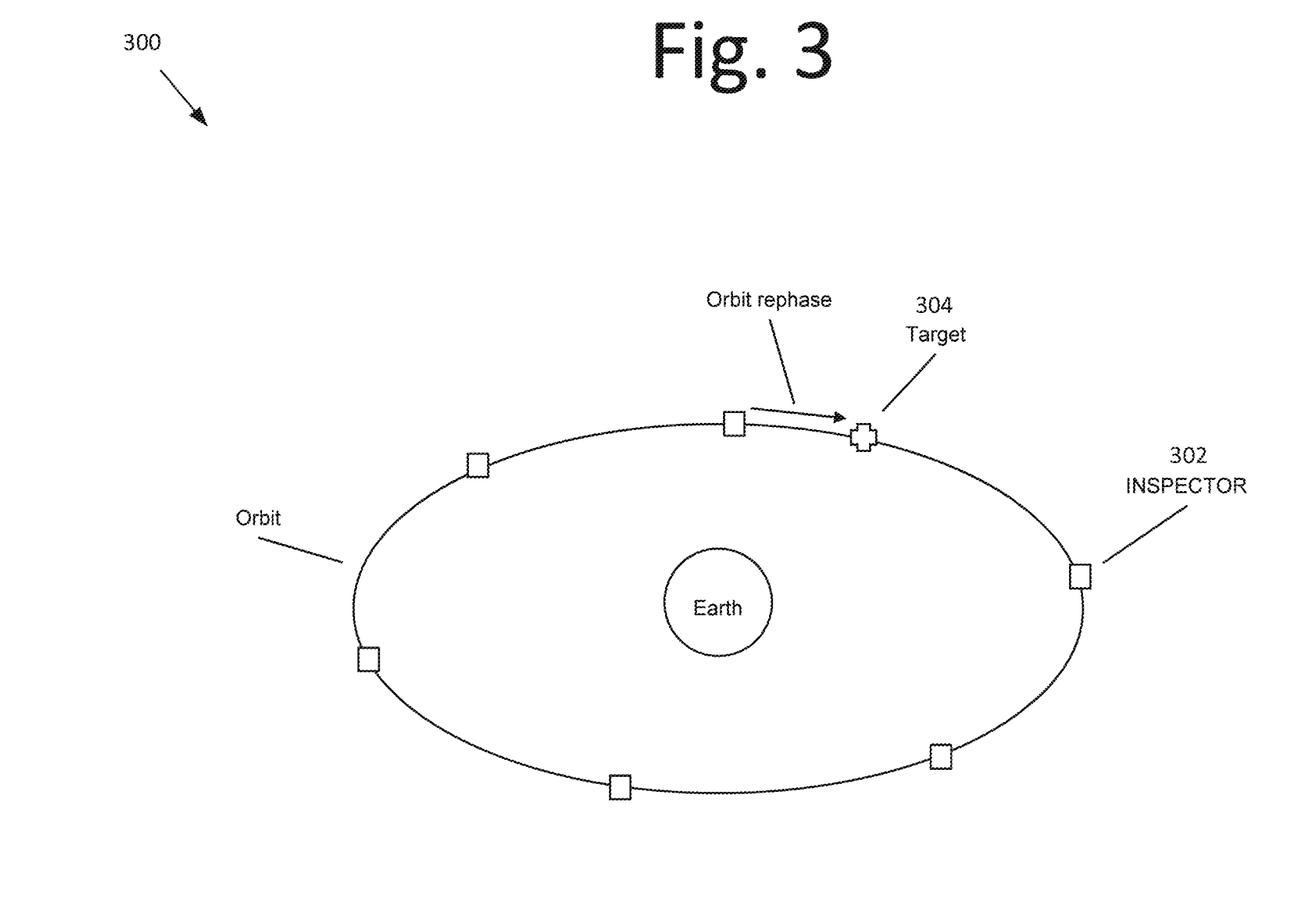
FIG. 3 is a diagram illustrating a system configured to show a single vehicle executing an orbit rephrase to inspect another target vehicle according to an embodiment of the present invention.

FIG. 3 is a diagram illustrating a system configured to show a single vehicle 302 executing an orbit rephrase to inspect another target vehicle 304 according to an embodiment of the present invention. In this embodiment, FIG. 3 shows one or more isotope tile vehicles in an Earth orbit with targets of interest (e.g., other satellites or spacecraft in a geosynchronous orbit). A single isotope tile vehicle 302 can activate its propulsion unit to rephase its orbit to approach the target for investigation using its onboard payload systems, such as a camera. This embodiment can utilize one or more isotope tile vehicles to monitor objects in a single orbit, performing orbit rephase (staying at the same altitude/orbit, but changing the relative position within that orbit) to inspect targets, or by using multiple vehicles, with the nearest isotope tile vehicle moving to inspect a target.

Figure 4:
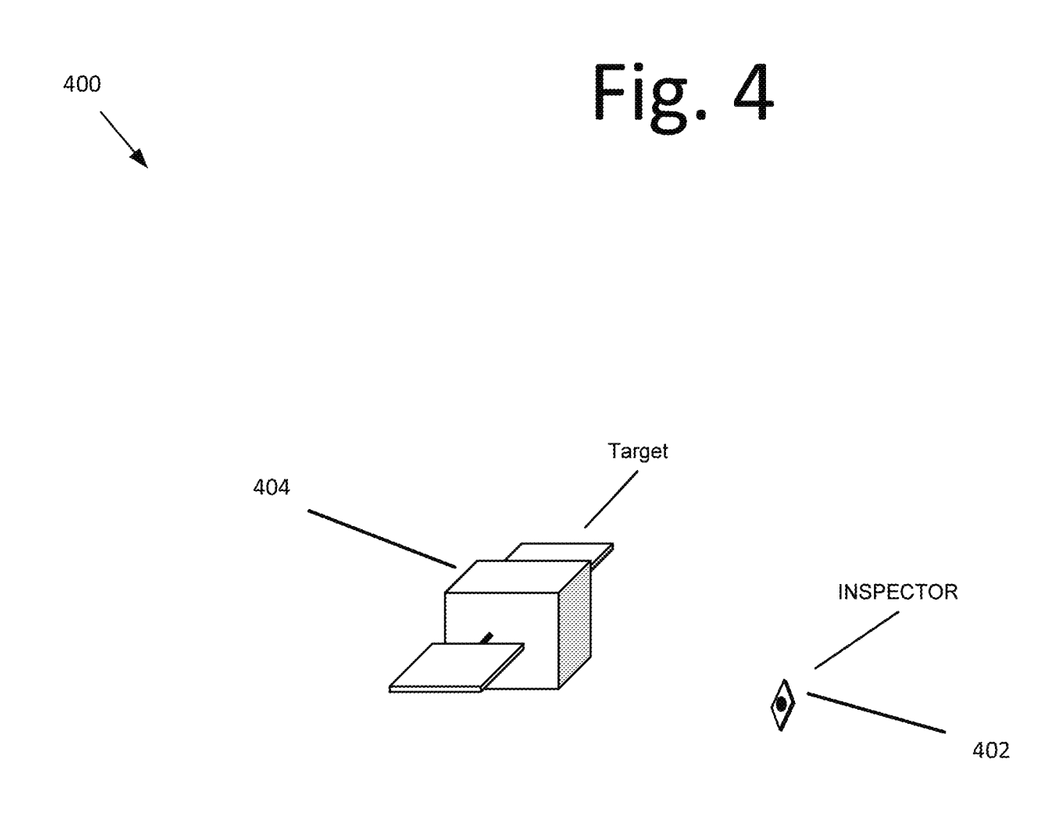
FIG. 4 is a diagram illustrating a system illustrating a target satellite and an isotope power source configured to perform an orbit adjustment to inspect a target of interest according to an embodiment of the present invention.

FIG. 4 is a diagram illustrating a system 400 illustrating a target satellite 404 and an isotope power source 402 configured to perform an orbit adjustment to inspect a target of interest according to an embodiment of the present invention. In this embodiment, a single vehicle 402 has changed its orbit to approach target 404, which may be malfunctioning, in need of resupply or refurbishment, or have other features requiring close inspection. After 402 adjusts its orbit to approach target 404, it can use its onboard optical systems (camera(s)) to perform fine position adjustments to bring 402 in close proximity of 404 for detailed imaging. The data from this inspection can then be transmitted to vehicle users through the use of the UHF antenna.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An isotope power source configured to act as a vehicle, comprising:
    a plurality of radioisotope power sources encased around one or more elements therein to form a tile-shaped vehicle, wherein
    each of the plurality of radioisotope power sources are distributed or are centrally located as a single central unit.

2. The isotope power source vehicle of claim 1, further comprising:
    a structure holding a plurality of radioisotopes with reaction wheels and star tracker for orientation, an array of electric propulsion units for maneuvering.

3. The isotope power source vehicle of claim 2, wherein the structure has a radius or length to thickness ratio of greater than 5:1.

4. The isotope power source vehicle of claim 2, wherein the structure is 15 cm×15 cm×2 cm.

5. The isotope power source vehicle of claim 2, wherein the structure weighs less than 20 kg.

6. The isotope power source vehicle of claim 2, wherein each of the plurality of radioisotope power sources within the isotope power source vehicle weighs less than 1 kg.

7. The isotope power source vehicle of claim 1, wherein the one or more elements comprise:
    one or more electrospray propulsion units configured to maneuver the isotope power source vehicle being a tile-shaped vehicle.

8. The isotope power source vehicle of claim 7, wherein the one or more electrospray propulsion units comprise a low propellant usage per orbital adjustment of <1 g causing the isotope power source to contain sufficient propellant to make more than 100 maneuvers.

9. The isotope power source vehicle of claim 1, wherein the one or more elements comprise:
    a radio frequency (RF) transmitter or laser transmitter configured to communicate with one or more of a plurality of isotope power sources and computational algorithms to generate a three dimensional (3D) coordinate system.

10. The isotope power source vehicle of claim 1, wherein the craft is a spacecraft or a ground vehicle or in a liquid "ocean".

11. The isotope power source of claim 1, wherein the isotope power source has a high aspect ratio of greater than >5:1 for length and width to thickness to function through isotope power generation, by using the large surface area to radiate heat for efficient heat to power conversion.

12. An isotope power source configured to act as a vehicle, comprising:
    a plurality of radioisotope power sources encased around one or more elements therein to form a tile-shaped vehicle, wherein
    each of the plurality of radioisotope power sources are distributed or are centrally located as a single central unit, and
    the one or more elements comprise one or more electrospray propulsion units configured to maneuver the tile-shaped vehicle.

13. The isotope power source vehicle of claim 12, wherein the one or more elements comprising:
    a plurality of reaction wheels and a star tracker for orientation, and an array of electric propulsion units for maneuvering the isotope power source vehicle.

14. The isotope power source vehicle of claim 13, wherein the structure has a radius or length to thickness ratio of greater than 5:1.

15. The isotope power source vehicle of claim 13, wherein the structure is 15 cm×15 cm×2 cm.

16. The isotope power source vehicle of claim 13, wherein the structure weighs less than 20 kg.

17. The isotope power source vehicle of claim 13, wherein each of the plurality of radioisotope power sources within the isotope power source vehicle weighs less than 1 kg.

18. The isotope power source vehicle of claim 12, wherein the one or more electrospray propulsion units comprise a low propellant usage per orbital adjustment of <1 g causing the isotope power source to contain sufficient propellant to make more than 100 maneuvers.

19. The isotope power source vehicle of claim 12, wherein the one or more elements comprise:
a radio frequency (RF) transmitter or a laser transmitter configured to communicate with one or more of a plurality of isotope power source vehicles and the computational algorithms to generate a three dimensional (3D) coordinate system.

20. The isotope power source vehicle of claim 12, wherein the 3D coordinate system:
is reported to an isotope power source vehicle or other vehicle operating within the coordinate system, wherein
the vehicle can perform precision movement within the coordinate system.

21. The isotope power source of claim 12, wherein the isotope power source has a high aspect ratio of greater than >5:1 for length and width to thickness to function through isotope power generation, by using the large surface area to radiate heat for efficient heat to power conversion.

* * * * *